Aug. 11, 1942.   E. H. BODDY   2,292,865
SUPPORTING MEANS FOR STORAGE RECEPTACLES
Filed Oct. 4, 1941
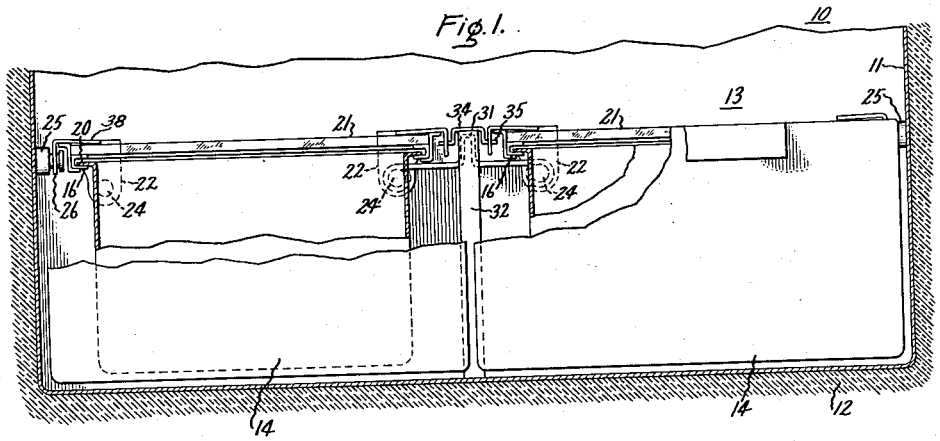
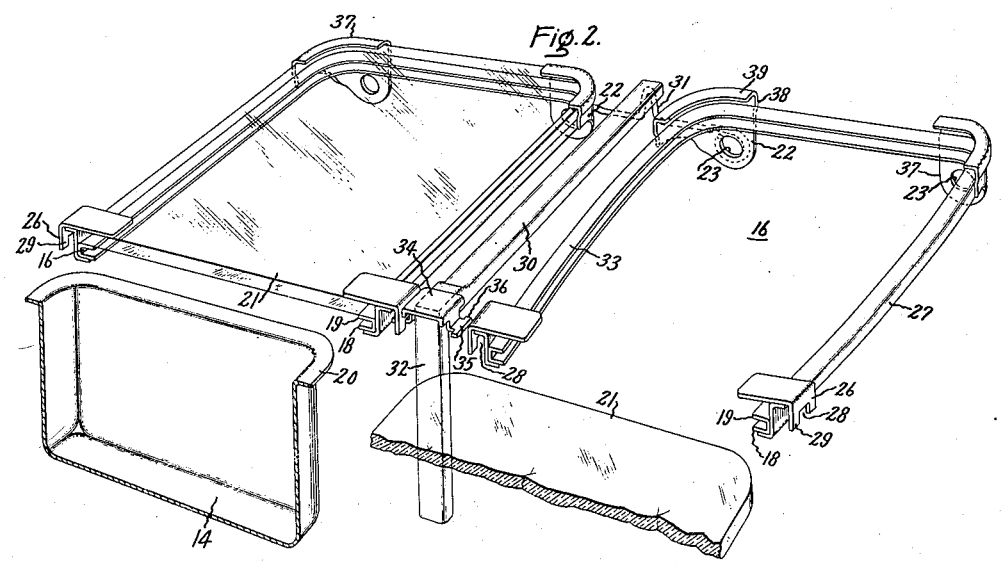
Inventor:
Edwin H. Boddy,
by Harry E. Dunham
His Attorney.

Patented Aug. 11, 1942

2,292,865

UNITED STATES PATENT OFFICE 2,292,865

SUPPORTING MEANS FOR STORAGE
RECEPTACLES

Edwin H. Boddy, Erie, Pa., assignor to General
Electric Company, a corporation of New York Application October 4, 1941, Serial No. 413,679

5 Claims. (Cl. 312—150)

This invention relates to food storage receptacles for use in refrigerators and the like and more particularly to means for supporting a food storage receptacle and a cover therefor.

It is an object of my invention to provide supporting means for food storage receptacles and the like having improved appearance, and simplicity and ruggedness of construction.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a partial view, partly in section, of a refrigerator cabinet or the like equipped with a structure embodying the principles of my invention, and Fig. 2 is an enlarged perspective view illustrating details of the supporting means disclosed in Fig. 1.

Referring to the drawing there is illustrated a portion of a refrigerator cabinet 10 having an inner sheet metallic liner 11 surrounded by suitable heat insulating material 12 defining a food storage compartment 13 which may be cooled in any satisfactory manner.

In order to store bulk foods, such as vegetables, fruits and the like, I have illustrated the use of a pair of food storage receptacles 14 suitably supported in the lower portion of the food storage compartment, the receptacles being open at the top. In order suitably to support the food storage receptacles, there are provided supporting members or frames 16. In the illustrated form of my invention, each of the supporting members of frames is formed from channel-shaped metallic stock formed into a substantially U-shaped frame member having the open side of the channel directed inwardly in order to provide a pair of inwardly directed or formed supporting portions 18 and 19 for supporting the outwardly flanged marginal rim 20 of the food storage receptacles and to support the cover member 21 for the receptacle, respectively. The covers 21 are preferably formed of glass in order to permit inspection of the contents of the receptacles. The frames 16 are suitably supported at the rear thereof as by means of brackets 22 integral with or otherwise suitably attached to the frame members. In the form of my invention shown in the drawing, the members 22 extend downwardly with respect to the frame at the rear corners thereof and are provided with suitable openings or apertures 23 so that the frame may be moved rearwardly to cause studs 24, carried by the rear wall of the cabinet to project through the openings. The front side of the frames is left open to permit slidable reception of the storage receptacles. The side of the frame adjacent the liner 11 is supported therefrom by suitable brackets or studs 25 suitably attached to the liner and suitable brackets 26 carried by the side arm 27 of the frame or integral therewith, if desired. The members 26 are arranged for engagement with the studs 25 as by means of slots or recesses 28 established by the provision of ears 29 and which serve to prevent longitudinal movement of the frame. By providing enlarged heads on the studs 25, lateral movement of the frame with respect to the studs may be prevented.

In order substantially to close the space between the covers and thereby improve the appearance of the assembled structure, I have provided a longitudinally extending channel-shaped member 30 supported at the rear by a suitable support, as for example, a suitably formed wire member 31 supported at either end on the studs 24 and having an upwardly directed loop for engagement with the rear end of the member 30. The member 30 is suitably provided with a vertically extending member 32 attached to or integral with the front end of the member 30. The lower end of the member 32 rests on the bottom wall of the food storage space 13.

In order to support the inner arms 33 of the frames, there is provided a member 34 suitably attached to the front end of the member 30 and having downwardly and laterally extending portions 35 adapted to extend into the recesses 28 on bracket members 26 suitably secured to the inner arms of the frame. The laterally extending part of the portion 35 may be provided with ears 36 to prevent, or at least to minimize, lateral movement of the arms 33.

I have provided means for holding the cover in place, which means engages the covers 21 at the corners only. In the form of my invention illustrated herein, I have provided at the rear corners brackets 37 having upwardly and inwardly directed portions or flanges 38 and 39, respectively, the brackets 37 extending in both directions along the frame portions from the rear corners. The walls 38 prevent horizontal movement of the rear portion of the cover, except in the forward direction. The flanges 39 prevent upward movement and the upper portion 19 of the frame prevents downward movement of the rear portion of the cover. In order to prevent sidewise or upward movement of the cover adjacent the front edge thereof, I have arranged the brackets 26 so that a portion thereof extends above the upper surface 19 of the frame in order to provide a recess or space for the reception of the cover, the inwardly directed portion 38 of the bracket 26 preventing vertical movement of the front corner of the cover.

The frames 16 are preferably formed from resilient material and the arms 27 and 33 are originally constructed with the distance between the free ends thereof being less than the width of the cover. In assembling the device, the cover is first inserted by separating the free ends of the frame sufficiently to receive the cover between the portions 38 of the brackets 26 and the upper surface of the supporting portion 19. Because of the resiliency of the side arms 27 and 33 the front edges or corners of the cover thus will be securely engaged, thereby preventing rattling or noise of the cover and also preventing accidental withdrawal or dislodgement of the cover. Thus, I have provided means for supporting the receptacle and cover in which the corners only of the cover are engaged. Moreover, by making the supporting means resilient, there is provided a force for urging the supporting means into firm engagement with the cover.

In order to improve the appearance of the assembly and to securely engage the upper surface of the cover, the horizontal portions 38 of the brackets 26 are preferably bent downwardly as best seen in Fig. 1 in order that the free edge of the horizontal portions will be urged into engagement with the top surface of the cover.

The horizontal portions 38 and 39 also facilitate stacking of the receptacles 14.

Modifications will occur to those skilled in the art. For example, the frame supporting member 22 and the cover engaging portions 37 have been illustrated as being integral and secured to the frame as by welding, for example. It will be understood, however, that any desired supporting or cover engaging means may be employed. Moreover, the U-shape illustrated herein is not essential in all forms of my invention. Thus, a frame may be provided having a plurality of members associated therewith for engaging the cover at a plurality of spaced points or positions or portions of the frame in order to prevent vertical movement of the cover and permit horizontal movement only in one direction. Moreover, the entire frame need not be resilient. It is sufficient that substantial portions adjacent the free end of the frame be sufficiently resilient to permit spreading of the arms in order to receive and to engage securely the front corners or edges of the cover when the cover is in the assembled position and thereby minimize movement and rattling of the cover. Moreover, separable resilient means are within the scope of my invention.

While I have shown a particular embodiment of my invention, I do not desire my invention to be limited to the particular construction shown and described, and I intend in the appended claims to cover all modifications within the spirit and scope of my invention.

What I claim as new and desire to secure by Letters Patent of the United States, is:

1. In combination with a food storage receptacle and a cover therefor, means for supporting said cover, said means comprising a substantially U-shaped member open at the front thereof, means associated with said member for retaining the rear corners of said cover, the side arms of said U-shaped member being provided with means resiliently engaging the front corners of said cover, and means for supporting said receptacle below said cover.

2. In combination with a receptacle and cover therefor, a substantially U-shaped frame member open at the front thereof, substantial portions of the adjacent free ends of said member being formed from a resilient material, the free ends having inwardly directed portions for engaging and supporting said receptacle and said cover, the distance between the free ends of said frame member before the cover is placed in the assembled position being less than the width of said cover, the resiliency of said free ends enabling said ends to be separated to permit reception of said cover by said ends.

3. In combination with a food storage receptacle and a cover therefor, means for supporting said cover, said means comprising a generally U-shaped member open at the front ends thereof, means engaging the rear corners of said cover for supporting said cover at the rear corners thereof, substantial portions of the side arms of said U-shaped member adjacent the free ends thereof being resilient and directed inwardly toward each other, said ends being spaced closer together at the free ends than the width of said cover before said cover is placed in the assembled position, each arm being arranged for securely engaging said cover adjacent a front corner thereof when said cover is in the assembled position, and means for carrying said receptacle below said cover.

4. In combination with a food storage receptacle and a cover therefor, a frame for supporting said receptacle and said cover, means disposed at spaced apart portions of said frame to prevent vertical movement of the cover and also horizontal movement thereof except in one direction, and said frame comprising resilient means urging the first-mentioned means into firm engagement with said cover.

5. In combination with a food storage receptacle and a cover therefor, a substantially U-shaped frame of resilient material and having a pair of inwardly directed flanges, one of said flanges being adapted to support said cover, the other of said flanges being adapted to support said receptacle, said frame being open at the front thereof, upwardly and inwardly directed means engaging said cover adjacent the front corners thereof, the arms of said frame being directed inwardly to urge said means adjacent said front corners against said cover, said inward directed means being turned downwardly into engagement with the top surface of said cover.

EDWIN H. BODDY.